No. 30,528.
PATENTED OCT. 30, 1860.
H. COLLIER.
DELINEATING THE COURSE OF RIVERS.
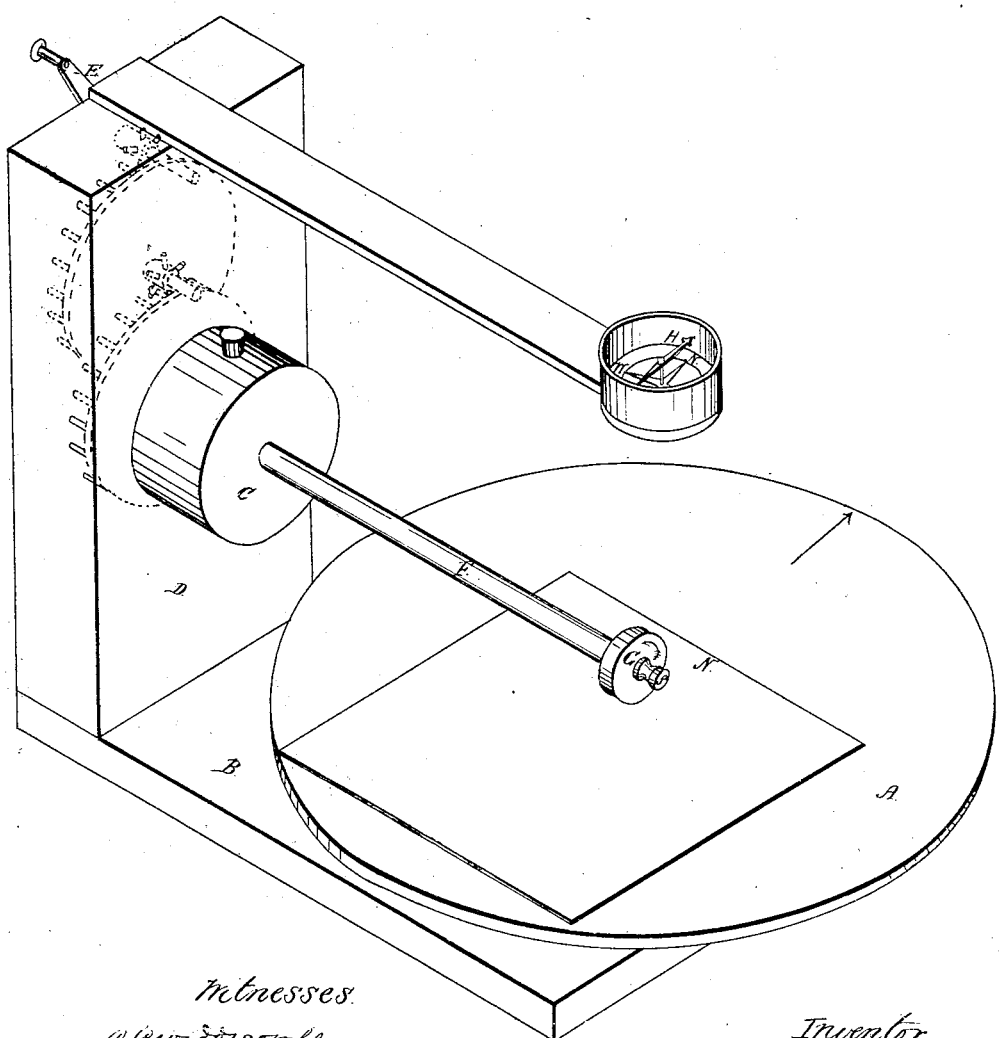

UNITED STATES PATENT OFFICE.

HORRACE COLLIER, OF SMITHVILLE, ARKANSAS.

MACHINE FOR DELINEATING THE COURSES OF RIVERS.

Specification of Letters Patent No. 30,528, dated October 30, 1860.

*To all whom it may concern:*

Be it known that I, HORRACE COLLIER, of Smithville, in the county of Lawrence and State of Arkansas, have invented a new and useful Mode of Delineating the Course of Rivers and Analogous Objects; and I hereby declare the following to be a full, clear, and exact description of the same, reference being had to the accompanying drawings, making part of the specification, and being a perspective view of an apparatus embodying my said invention.

The nature of the invention consists in the use of a "plotter" rotated in a plane parallel with the line of motion of the vessel upon which it is fixed and at a speed bearing a certain relation to that of the vessel; the said plotter acting to forward beneath it the sheet upon which the chart is taken and the said sheet being kept constantly in a position corresponding with the points of the compass by means of a table rotated on a vertical axis immediately beneath the said plotter as will be hereinafter more fully explained.

In the annexed illustration of my invention A represents a table supported upon a base B and adapted to rotate in a horizontal plane.

C is an ink reservoir pivoted to a standard D and rotated therein by means of a crank E and gearing represented by dotted lines.

F is a hollow shaft extending horizontally from the center of the reservoir C and terminating precisely over the axis of the table A in a "plotter" G of soft porous material retained upon the end of the shaft by a compression nut $f$ the adjustment of which regulates the flow of ink as may be needful. The plotter G is in practice of a width bearing such proportion to that of the river to be delineated as the motion of the periphery of the said plotter bears to that of the boat. The table is supported in contact with the plotter by means of a spring under its center.

H represents a compass which is placed upon or attached to some convenient part of the machine to indicate the position in which the table is to be held.

The operation is as follows: The machine is so placed upon the boat as to fix the plane of rotation of the plotter G in a position parallel with the line of motion, and the said plotter steadily rotated through the medium of the crank E at a speed bearing a certain relation to that of the boat, which may be governed by the revolution of the engines or otherwise. A sheet of paper is then placed upon the table with its edge beneath the plotter the rotation of which slides the paper upon the table beneath it leaving an indication of its passage by the ink which oozes out through its pores from the hollow shaft F. Each sheet is marked near one edge with the letter N, to indicate "North" and is placed upon the table in a position parallel with the needle of the compass and retained in such position by rotating the table as may be needful to compensate for the turns made by the boat in following the sinuosities of the river. As the plotter approaches the edge of one sheet another is placed in position, to receive it and by this means a plot of any extent desired is taken on successive sheets.

The apparatus here selected to illustrate my invention is one of simple form which has been successfully tested in practice but the "plotter" may if preferred be rotated automatically by connection with the propelling power of the vessel or carriage upon which it is placed or otherwise and the table carrying the paper may be so constructed and supported as to be held automatically in position by the power of a magnetic needle attached to it. It will also be apparent that various other modifications may be made without departing from the principle of my invention which depends upon the use of a "plotter" rotated at a speed bearing a certain relation to the motion of the vessel and sliding beneath it a sheet of paper which is kept in a certain position in relation to the points of the compass.

I claim as new and of my invention—

Delineating the course of rivers or other courses by means of a "plotter" rotating at a speed corresponding with that of the boat or other object upon which it is carried, and marking upon a sheet which is held in position corresponding with the points of the compass substantially as and for the purposes set forth.

In testimony of which invention, I hereunto set my hand.

HORRACE COLLIER.

Witnesses:
OCTAVIUS KNIGHT,
JAMES N. GRIDLEY.